(12) United States Patent
Soga et al.

(10) Patent No.: US 7,424,900 B2
(45) Date of Patent: Sep. 16, 2008

(54) FINGER CUTTER

(75) Inventors: Katsuaki Soga, Niwa-Gun (JP); Atsushi Tsuchiya, Niwa-Gun (JP)

(73) Assignee: Kanefusa Kabushiki Kaisha, Niwa-Gun (JP)

( * ) Notice: Subject to any disclaimer, the term of this patent is extended or adjusted under 35 U.S.C. 154(b) by 79 days.

(21) Appl. No.: 10/485,191

(22) PCT Filed: Jul. 29, 2002

(86) PCT No.: PCT/JP02/07690

§ 371 (c)(1),
(2), (4) Date: Jan. 28, 2004

(87) PCT Pub. No.: WO03/013805

PCT Pub. Date: Feb. 20, 2003

(65) Prior Publication Data

US 2004/0250881 A1    Dec. 16, 2004

(30) Foreign Application Priority Data

Aug. 6, 2001   (JP)  ............... 2001-237812

(51) Int. Cl.
B27C 1/00  (2006.01)
B27C 5/00  (2006.01)
B27G 13/00  (2006.01)

(52) U.S. Cl. ..................... 144/230; 144/241

(58) Field of Classification Search ........... 144/218, 144/220, 230, 241; 76/112, 115
See application file for complete search history.

(56) References Cited

U.S. PATENT DOCUMENTS

| 1,671,600 A | * | 5/1928 | Medholdt ............. 144/224 |
| 2,019,934 A | * | 11/1935 | Schroter et al. ........ 407/118 |
| 3,576,200 A | * | 4/1971 | Elmes ................ 83/848 |
| 4,068,688 A | * | 1/1978 | Benson .............. 144/91.2 |
| 4,291,445 A | * | 9/1981 | Johnson ............. 407/29.12 |

(Continued)

FOREIGN PATENT DOCUMENTS

JP   63-167718   7/1988

(Continued)

OTHER PUBLICATIONS

Website: Wikepedia Encyclopedia, "Carbon Steel", footnote 2.*

Primary Examiner—Bena Miller
(74) Attorney, Agent, or Firm—Burr & Brown

(57) ABSTRACT

Cutting portion regions of replaceable blades that extrude outward in a radial direction at a plurality of portions in a peripheral direction of an outer periphery of a body of a finger joint cutter are arranged in that, as for a cutting portion material that comprises cutting edge, tip end cutting portions are formed of a steel material of high hardness and base portion side cutting portions, which are the remaining portions, are formed of a steel material that exhibits a higher toughness than that of the tip end cutting portions. It is possible to improve the wear resistance through the tip end cutting portions and to improve the chipping resistance by the base portion side cutting portions. The steel material of high hardness comprising the tip end cutting portions and the steel material of high toughness comprising the base portion side cutting portions are successively joined through forge welding.

4 Claims, 5 Drawing Sheets

U.S. PATENT DOCUMENTS

| | | | | |
|---|---|---|---|---|
| 4,462,293 | A * | 7/1984 | Gunzner | 83/855 |
| 4,658,875 | A * | 4/1987 | Grabovac | 144/230 |
| 4,759,394 | A * | 7/1988 | Clemenson | 144/235 |
| 4,911,037 | A * | 3/1990 | Werz | 76/112 |
| 4,977,937 | A * | 12/1990 | Hessenthaler | 144/241 |
| 5,146,963 | A * | 9/1992 | Carpenter et al. | 144/231 |
| 5,163,490 | A * | 11/1992 | Meis | 144/230 |
| 5,201,352 | A * | 4/1993 | Hult | 144/218 |
| 5,368,078 | A * | 11/1994 | Rupe | 144/234 |
| 5,381,840 | A * | 1/1995 | Bowen | 144/24.12 |
| 5,609,518 | A * | 3/1997 | Lucchesi | 451/541 |
| 5,658,101 | A * | 8/1997 | Hammer | 407/37 |
| 5,996,657 | A * | 12/1999 | Riesselman | 144/235 |
| 6,035,844 | A * | 3/2000 | Otani et al. | 125/15 |
| 6,189,584 | B1 * | 2/2001 | Cayce | 144/230 |
| 6,758,638 | B1 * | 7/2004 | Mihic | 407/107 |

FOREIGN PATENT DOCUMENTS

| | | | |
|---|---|---|---|
| JP | 2-104432 | A1 | 4/1990 |
| JP | 06-015608 | | 1/1994 |
| JP | 07-323403 | | 12/1995 |
| JP | 9-99404 | A1 | 4/1997 |
| JP | 09099404 | A * | 4/1997 |
| JP | 10-264108 | A1 | 10/1998 |
| JP | 10264108 | A * | 10/1998 |

\* cited by examiner

FINGER CUTTER

BACKGROUND OF THE INVENTION

The present invention relates to a finger joint cutter, which is a rotating cutting tool for processing finger joints, a kind of joint used with wood materials or the like.

As illustrated in FIG. 5, a finger joint cutter 1 includes a plurality of cutting portions 3 of a chevron wedge-like shape that project outward in a radial direction from a plurality of portions around an outer periphery of a body 2. A wedge-like finger joint F including a plurality of narrow and deep grooves at an end portion of an object M is cut using the cutting portions 3. Since such deep grooves are processed, the degree of wear of cutting edges of the cutting portions 3 of the finger joint cutter 1 will remarkably vary depending on regions of the cutting edges. The wear of cutting edges near the tip ends of the cutting portions that cut the groove bottoms of finger joints will be particularly large. Where the progress of wear of cutting edges near the tip ends of the cutting portions is fast, the progress of wear of the cutting edges at portions on a base side that continue into the worn tip ends of the cutting edges will become fast, and the life of the cutting portions will become short. For restricting such wear of cutting edges, it is possible to employ materials of high hardness such as high-speed tool steel or cemented carbide as a cutting portion material.

However, by forming the cutting edges of a high-hardness material, the toughness of the cutting portions will decrease which may lead to chipping of cutting portions. In particular, chipping of bases of cutting portions or peripheries thereof is apt to occur. Usage of the cutter will become almost impossible at the very point of time such chipping of cutting portions occurs. It will therefore become necessary to exchange replaceable blades or the cutter, and a drawback is presented in that the damage will be by far larger compared with simple wear of cutting edges. This is the reason why finger joint cutters having greater chipping resistance at the expense of lower wear resistance are generally employed. For instance, the hardness of the high-speed tool steel exhibiting wear resistance is adjusted through heat treatment to be relatively low, ranging around HRC 58 to 61.

SUMMARY OF THE INVENTION

The present invention solves the above-mentioned problems, and it is an object thereof to provide a finger joint cutter that is capable of improving the wear resistance while providing the cutting portions with chipping resistance.

For achieving the above object, the present invention is characterized in that in a finger joint cutter including cutting portions that project outward in a radial direction at a plurality of portions in a peripheral direction of an outer periphery of a body and that form finger joints by processing end portions of objects to be cut through the cutting portions, as for a cutting portion material that comprises the cutting portion, a periphery of tip end of the cutting portion is formed of a steel material of high hardness while remaining portion of the cutting portion is formed of a steel material that exhibits a higher toughness than that of the steel material of the periphery of the tip end such that the hardness in the periphery of the tip end of the cutting portion is higher than the hardness of the remaining portion of the cutting portion.

In the present invention, since the cutting edges proximate of tip ends of the cutting portions that perform cutting of groove bottoms of finger joints are comprised of a steel material exhibiting high hardness, it is possible to restrict progress of wear of cutting edges proximate of tip ends of the cutting portions. On the other hand, while the cutting edges of portions other than those proximate of tip ends of cutting portions exhibit a lower hardness than the cutting edges proximate of tip ends of cutting portions, it is possible to restrict chipping of the cutting portions since they are made of a steel material exhibiting high toughness.

In this manner, according to the present invention, it is possible to improve the wear resistance through the cutting edges proximate of the tip ends that are comprised of a steel material having a high hardness, and since it is possible to improve the chipping resistance through cutting edges of remaining portions that are formed of a steel material exhibiting a higher toughness than the cutting edges proximate of tip ends, it is possible to provide a finger joint cutter having cutting portions that exhibit both, suitable wear resistance and chipping resistance. Moreover, according to the present invention, usage of a material for the tip end cutting portions that includes high-valent elements and that exhibits wear resistance can be minimized.

The finger joint cutter of the present invention may be arranged in that the steel material of high hardness and the steel material of high toughness may be joined through forge welding. With this arrangement, it is possible to successively join steel materials of different properties. The occurrence of non-succeeding portions, as in brazing material layers in view of wear resistances, can be avoided. As a result, joining of the steel material of high hardness and the steel material of high toughness can be successively joined through forge welding so that it is possible to achieve a continuous wear resistance at the cutting edges according to the present invention.

Further, the finger joint cutter of the present invention may be arranged in that at least flanks (outer peripheral flanks, side flanks) that continue from the cutting edges of the cutting portions are covered by a hard film. With this arrangement of forming a hard film on the flanks that continue from the cutting edges of the cutting portions, the cutting edges can be maintained to be of sharp edges for a long period of time. This effectively acts particularly on cutting edges of cutting portions that are comprised of a high-toughness steel material that is inferior in wear resistance, and the wear resistance can be remarkably compensated. As a result, according to the present invention, the wear resistance can be improved without degrading the toughness of the cutting portions, and it is particularly suitable and quite effective for compensating the wear resistance of the high-toughness steel material.

BRIEF DESCRIPTION OF THE DRAWINGS

FIG. 2-B is a side view illustrating a cutting portion of the finger joint cutter.

DETAILED DESCRIPTION OF THE PREFERRED EMBODIMENTS

Figure 1:
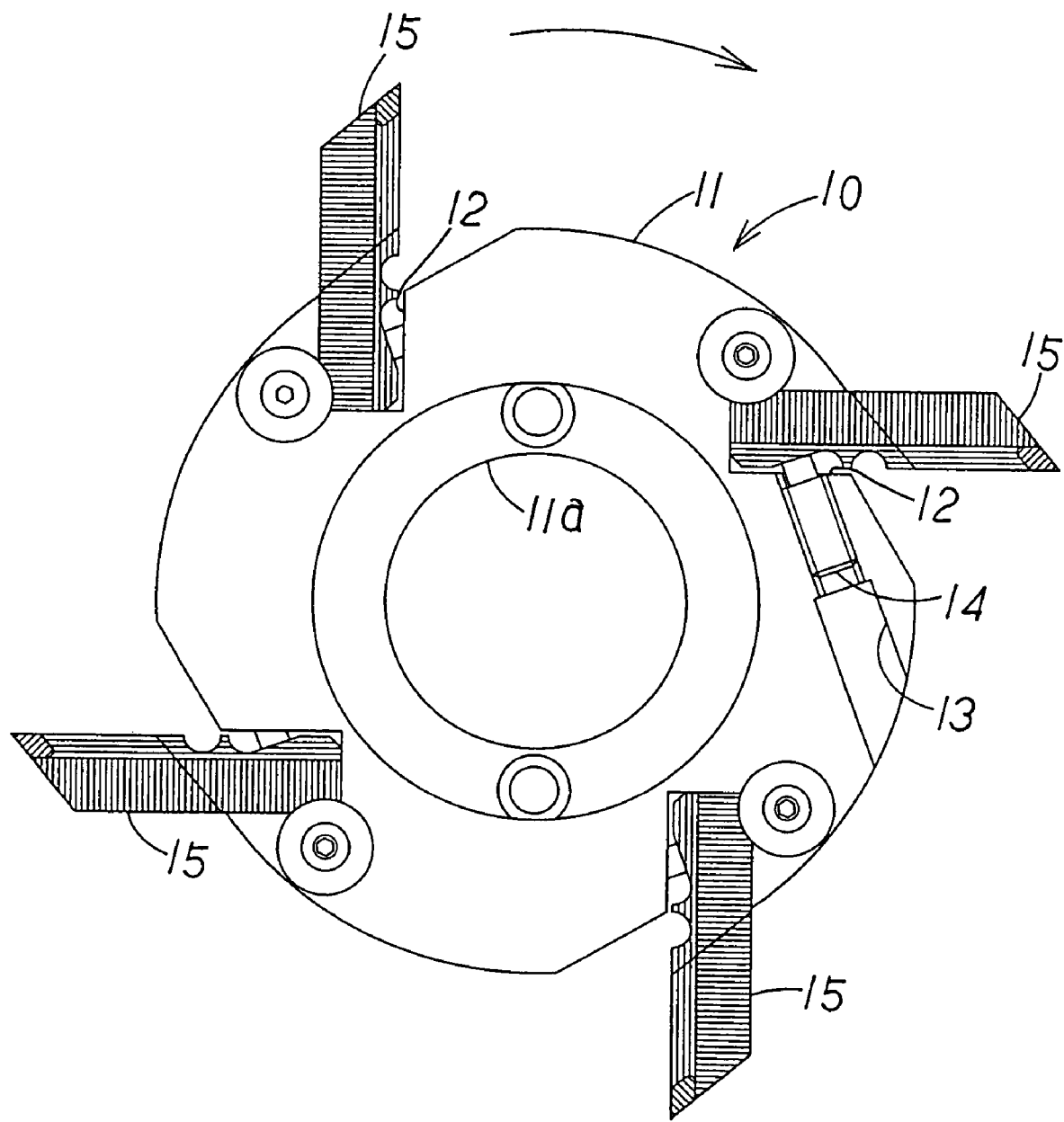
FIG. 1 is a side view illustrating a finger joint cutter according to one embodiment of the present invention.
Figure 2A:
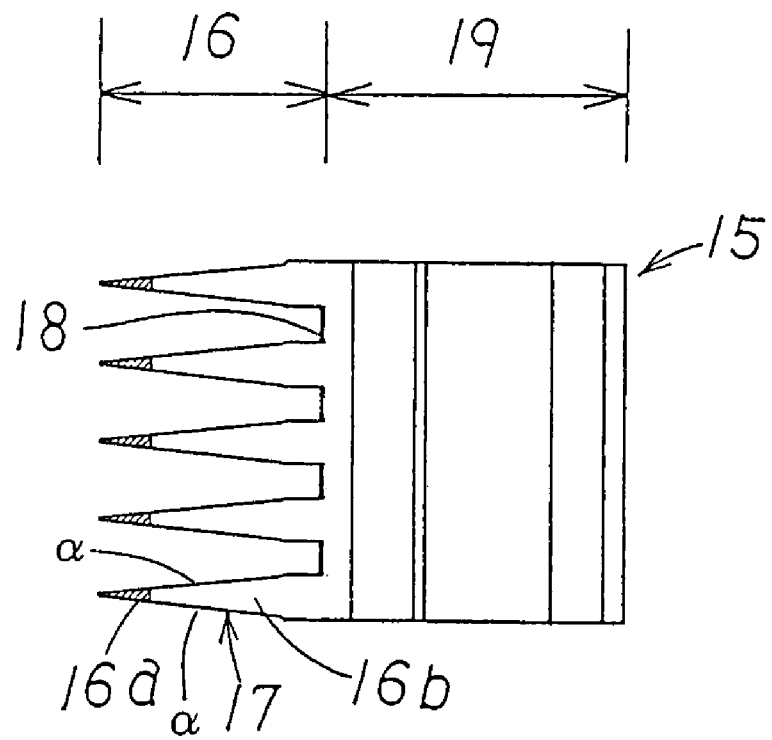
FIG. 2-A is a front view illustrating a cutting portion of the finger joint cutter.
Figure 2B:
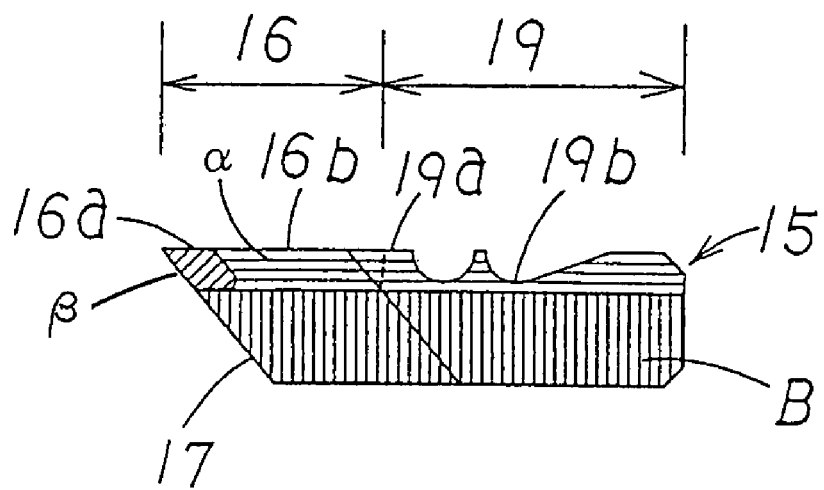

One embodiment of the present invention will now be explained on the basis of the drawings. FIG. 1 illustrates a replaceable blade type finger joint cutter according to the present invention through a side view. FIGS. 2-A and 2-B illustrate a replaceable blade 15 through a front view and a side view.

A finger joint cutter 10 is formed with a cylindrical shaped body 11 that is made of steel and is formed with a central hole 11a for inserting a main shaft in its center, and mounting seats 12 extending in axial directions are provided at four portions in a peripheral direction of a peripheral wall of the body 11. Each mounting seat 12 is a concave portion that is inclined frontward in a rotating direction with respect to a radial direction at an angle of approximately 30° and that is notched in a substantially rectangular shape. Replaceable blades 15 are inserted and fitted into the mounting seats 12. Mounting holes 13 are formed on an outer periphery of the body 11 that communicate from a rotating front of the mounting seats 12 to the mounting seats 12. The mounting seats 12 side of the mounting holes 13 are formed as screw holes, and bolts 14 for fixing the replaceable blades 15 are screwed and attached to the screw holes.

As illustrated in FIG. 2, each replaceable blade 15 is a rectangular thick plate, and a portion extending from one end in a longitudinal direction to a substantially central position comprises a cutting portion region 16 while a portion on the other end side in the longitudinal direction comprises a base portion 19. One end in the longitudinal direction of the cutting portion region 16 is arranged in that it inclines in a thickness direction and in that a cutting edge side thereof (upper side in FIG. 2-B) extrudes by forming a sharp edge. Moreover, the cutting portion region 16 is provided with five elongated wedge-shaped cutting portions 17 that point in a style of symmetric chevrons at equal intervals including those at both ends. Clearances 18 of substantially the same widths as the widths of the cutting portions 17 are formed between the cutting portions 17.

The replaceable blades 15 are arranged in that the entire cutting portion regions 16 and the base portions 19 differ in materials between an edge metal layer on the cutting edge side having a small thickness and a back metal layer B having a large thickness. The material for the back metal layer B may be comprised of a steel material of high toughness, for instance, alloy tool steel or structural steel. In the edge metal layer, the tip end cutting portions 16a disposed on a tip end side and having a short length in a longitudinal direction are formed of a steel material exhibiting high hardness together with some degree of wear resistance, for instance, high-speed tool steel. The edge metal layer of the base side edge portions 16b and other extension portions 19a that comprise portions other than the tip end cutting portions 16a is formed of a steel material that has a hardness that is lower than that of the tip end cutting portions 16a but that has a higher toughness, for instance, a semi-HSS or alloy tool steel, which are steel materials that approximate high-speed tool steel. A longitudinal directional length of the tip end cutting portions 16a is in a range of 1 mm to approximately half of the length of the cutting portions. Where the length is less than 1 mm, effects of the tip end cutting portions 16a with respect to wear will be insufficient, whereas when the length becomes longer than half of the length of the cutting portions, the chipping resistance of the tip end cutting portions 16a will become insufficient. Joining of the tip end cutting portions 16a and the base portion side cutting portions 16b is formed through forge welding as will be described later. In this respect, the extension portions 19a are formed with abutting concave portions 19b at which the bolts 14 for fixing the replaceable blades 15 to the mounting seats 12 abut.

Figure 3:
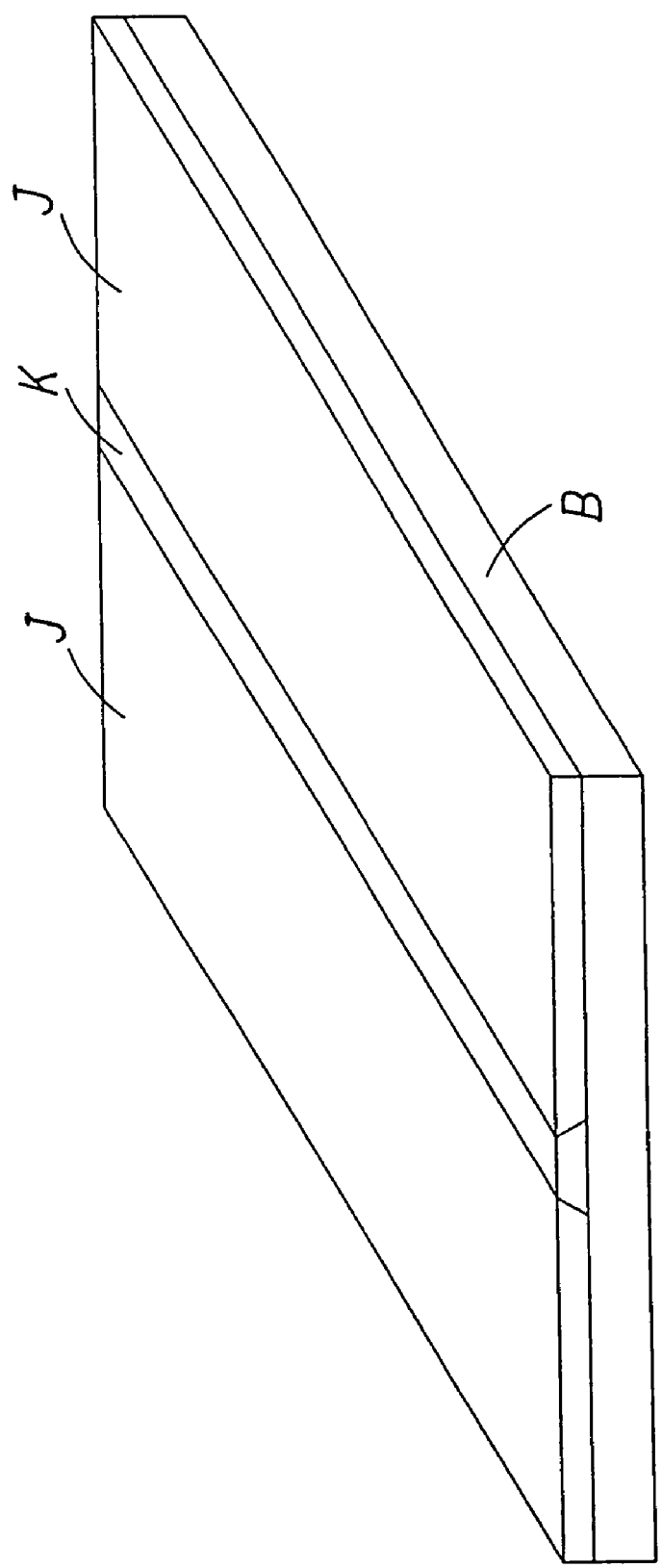
FIG. 3 is a perspective view for explaining a laminated condition of materials for manufacturing the cutter portions of the above finger joint cutter.

For forming the replaceable blade 15, as shown in FIG. 3, a raw material plate is employed that is obtained by joining an elongated high-speed tool steel of high hardness to the back metal layer B which is a thick plate, as a steel material K that comprises the tip end cutting portions, and by joining an alloy tool steel or a structural steel which is a steel material J of high toughness, with the high-speed tool steel pinched between. Here, joining of the high-speed tool steel of the steel material K and the alloy tool steel of the steel material J and joining thereof with the back metal layer B is formed by forge welding in which pressure-bonding is performed with both members being in a condition in which they are heated at high temperature. With this arrangement, the high-speed tool steel of the steel material K and the alloy tool steel of the steel material J may be successively joined to be formed in a condition in which wear resistances of both members are succeeding. By cutting the above raw material plate at an intermediate position of the steel material K in the longitudinal direction in FIG. 3, and by further cutting the same at specified widths at right angles with respect to the longitudinal direction of the steel material K and processing the cut pieces of cutting portions through machine processing, replaceable blades 15 are obtained.

Figure 4:
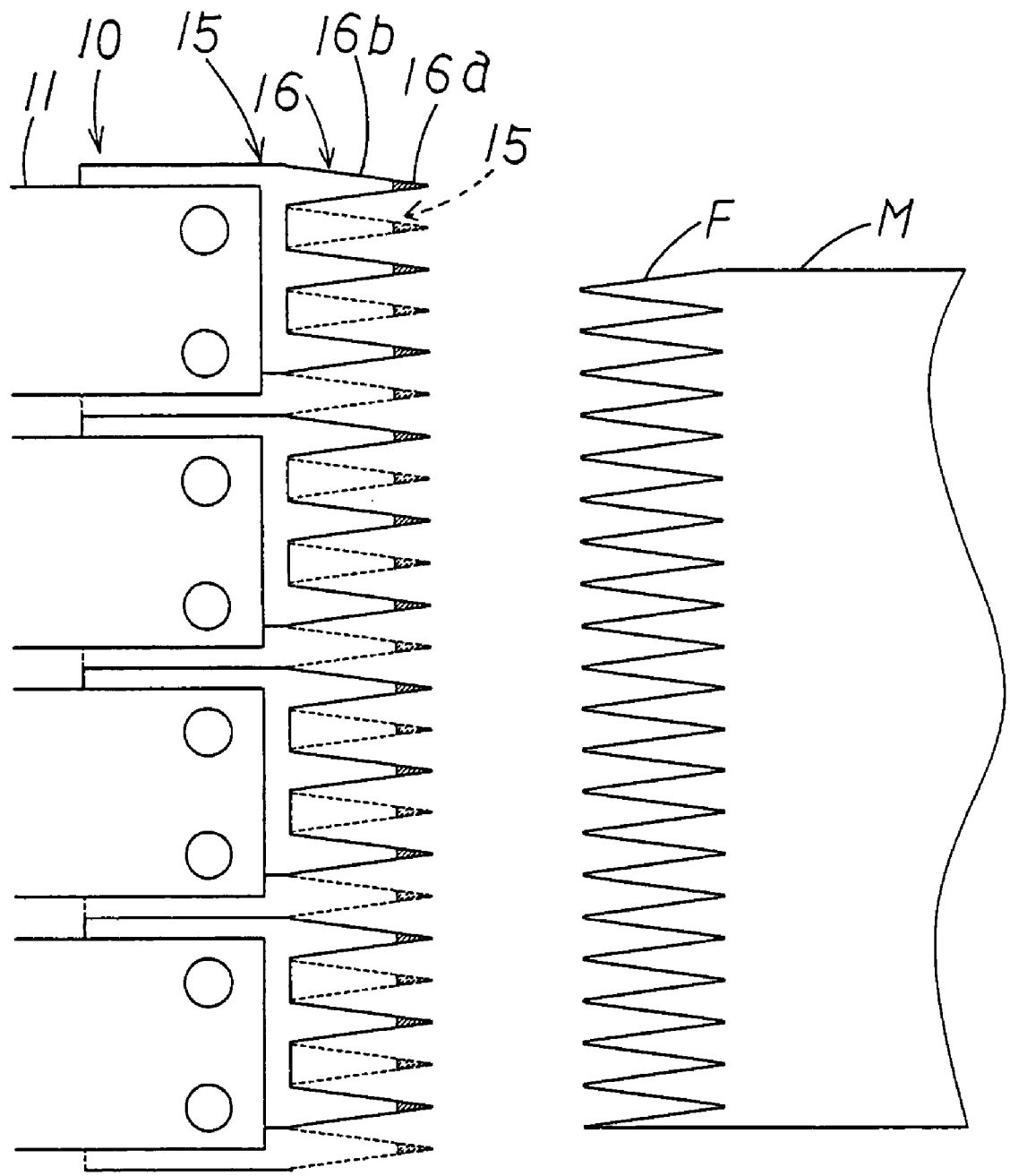
FIG. 4 is an explanatory view illustrating a relationship between a part of an outer peripheral portion of the above finger joint cutter and a finger joint.
Figure 5:
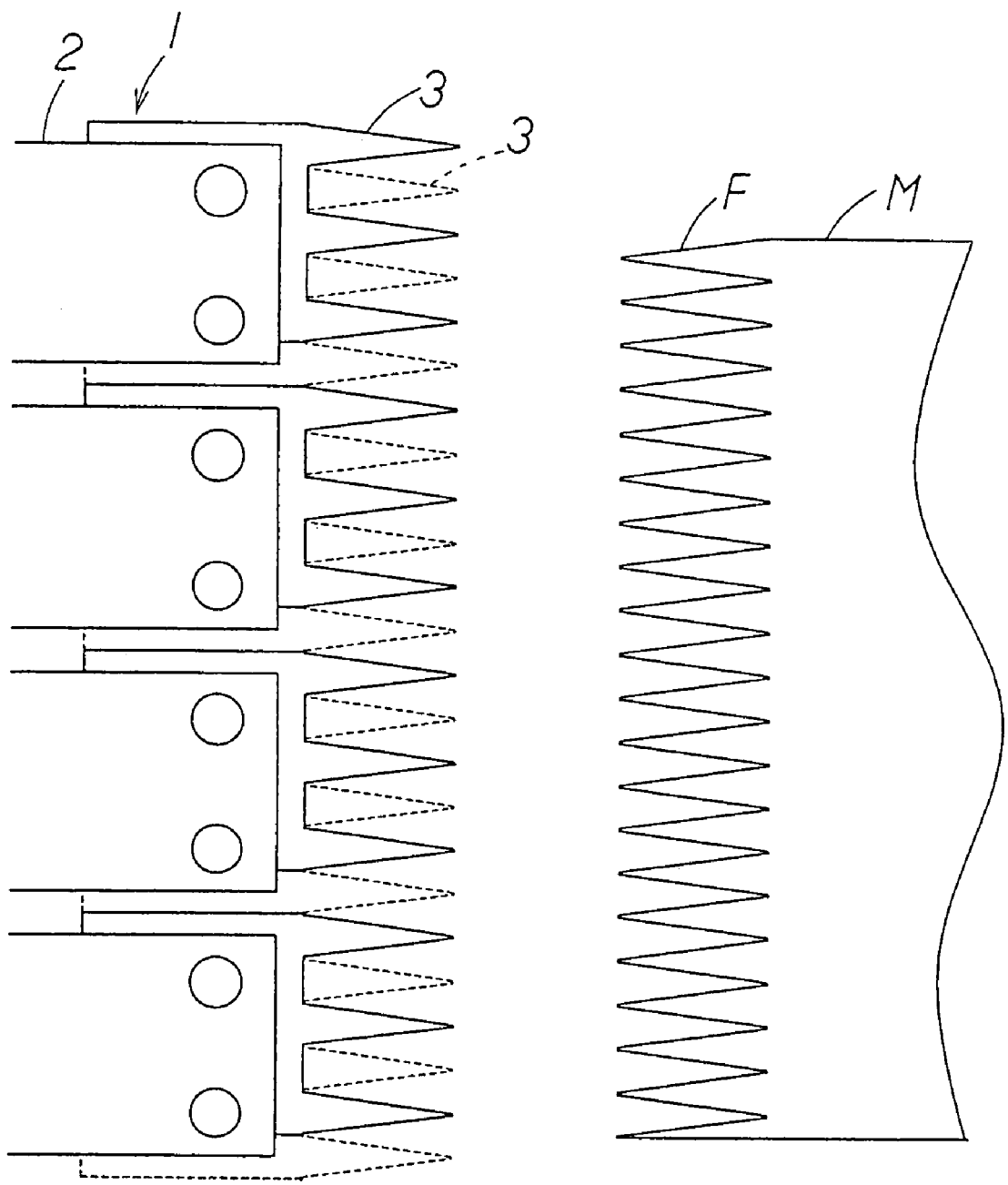
FIG. 5 is an explanatory view illustrating a relationship between a part of an outer peripheral portion of the finger joint cutter and a finger joint according to a prior art example.

The replaceable blades 15 are inserted and fitted into the mounting seats 12, and by abutting the bolts 14 that are screwed to the mounting holes 13 against concave portions 19b and tightening, they are fixed to the mounting seats 12. As illustrated in FIG. 4, one replaceable blade 15 that is fixed at one of pair of opposing mounting seats 12 is fixed by being shifted from another replaceable blade 15 that is fixed to another pair of opposing mounting seats 12 by one pitch. By both replaceable blades 15 that are disposed alternately in the peripheral direction, it is possible to form finger joints F in which successive protrusions are disposed in the objects to be cut M.

Since the replaceable blades 15 of the finger joint cutter 10 are arranged in that cutting edges of tip end cutting portions 16a that perform cutting of groove bottoms of finger joints are formed of a material of high hardness, it is possible to restrict progress of wear of the cutting edges of the tip end cutting portions 16a. On the other hand, while the base portion side cutting portions 16b are of a lower hardness than the tip end cutting portions 16a, they exhibit a higher toughness compared to the tip end cutting portions 16a so that the effect of restricting chipping is improved. In this manner, according to the present invention, it is possible to obtain replaceable blades 15 for a finger joint cutter 10 that exhibit both, chipping resistance and wear resistance. Since a steel material of high hardness and a steel material of high toughness can be joined successively through forge welding, it is possible to avoid occurrence of non-continuous portions of the wear resistance layers as in brazing layers when performing joining through brazing materials.

In this respect, while the back metal layer exhibits a high toughness and is thus effective in securing chipping resistance, it is possible to omit the same by thickening the edge metal layer. Since the alloy tool steel or semi-HSS comprising the base portion side cutting portions exhibits a considerable toughness, it is possible to provide chipping resistance even without the back metal layer. For joining the back metal layer and the cutting portions, it is possible to perform brazing instead of forge welding. The steel material may also be rolled steel or sintered steel.

For the joining of the tip end cutting portions and the base portion side cutting portions, it is possible to increase the hardness as the joining comes closer to the tip end side and to decrease the hardness in a slanting manner as it comes closer to the cutting portion base by devising a temperature distribution when performing heat treatment of the cutting portion material. By suitably selecting various types of steel materials that are to be the cutting portion materials for the tip end cutting portions and the base portion side cutting portions, it is possible to set the respective steel materials to be of desired hardness, respectively, by performing general heat treatment (quenching, tempering) in which uniform heating and uniform cooling is performed.

It is also possible to coat a hard film on the cutting portions so that the wear resistance of the cutting portions is further improved. The hard film shall be formed on flanks such as the outer peripheral flanks β or the side flanks α while avoiding the cutting faces of the cutting portions. A particularly preferable type of the hard film for the present invention is of chrome type such as chrome nitride or chromic acid nitrides.

Table 1 and Table 2 below illustrate examples of combinations between the steel material K, the steel material J and the back metal B as one embodiment in which a hard film is coated and as another in which no coating is performed. Note that the symbols of the types of steel indicate the followings.

M: High-speed tool steel that has undergone ingot making through dissolution.

R: A steel material approximating the high-speed tool steel that has undergone ingot making through dissolution (Semi-HSS).

P: High-speed tool steel that has undergone ingot making through powder metallurgy.

K: Anti-shock tool steel

SCM: JIS-SCM420 (chrome molybdenum steel) The steel material J in Nos. 2 and 3 of Table 1 corresponds to a product made by Hitachi Metals, Ltd. (Material symbol YXR-3) while its chemical composition is unknown.

TABLE 1

Embodiment in which a hard film is coated

| No. | position | type of steel | hardness HRC | chemical composition % | | | | | | | | | |
|---|---|---|---|---|---|---|---|---|---|---|---|---|---|
| | | | | C | Si | Mn | P | S | Cr | W | Mo | V | Co |
| 1 | steel material K | M | 66.5 | 1.0~1.1 | 0.5 or less | 0.25~0.4 | 0.025 or less | 0.01 or less | 3.5~4.25 | 1.25~2.0 | 9.0~10.0 | 1.0~1.5 | 7.75~8.75 |
| | steel material J | K | 58.5 | 0.4~0.5 | 0.8~1.0 | 0.25~0.45 | 0.025 or less | 0.01 or less | 8.0~9.0 | 1.0~1.5 | 1.5~2.0 | 0.2~0.4 | |
| | back metal B | K | 58.5 | 0.4~0.5 | 0.8~1.0 | 0.25~0.45 | 0.025 or less | 0.01 or less | 8.0~9.0 | 1.0~1.5 | 1.5~2.0 | 0.2~0.4 | |
| 2 | steel material K | P | 64.0 | 1.3 | | | | | 4.0 | 6.0 | 5.0 | 3.0 | 8.0 |
| | steel material J | R | 58.5 | unknown (correspond to YXR-3) | | | | | | | | | |
| | back metal B | K | 56.5 | 0.4~0.5 | 0.8~1.0 | 0.25~0.45 | 0.025 or less | 0.01 or less | 8.0~9.0 | 1.0~1.5 | 1.5~2.0 | 0.2~0.4 | |
| 3 | steel material K | P | 64.0 | 1.3 | | | | | 4.0 | 6.0 | 5.0 | 3.0 | 8.0 |
| | steel material J | R | 58.5 | unknown (correspond to YXR-3) | | | | | | | | | |
| | back metal B | SCM | 35.0 | 0.18~0.23 | 0.15~0.35 | 0.6~0.85 | 0.33 or less | 0.33 or less | 0.9~1.2 | ~ | 0.15~0.3 | ~ | ~ |

TABLE 2

Embodiment in which a hard film is not coated

| No. | position | type of steel | hardness HRC | chemical composition % | | | | | | | | | |
|---|---|---|---|---|---|---|---|---|---|---|---|---|---|
| | | | | C | Si | Mn | P | S | Cr | W | Mo | V | Co |
| 2 | steel material K | P | 64.0 | 1.3 | | | | | 4.0 | 6.0 | 5.0 | 3.0 | 8.0 |
| | steel material J | M | 60.0 | 0.8~0.9 | 0.15~0.35 | 0.25~0.4 | 0.025 or less | 0.01 or less | 3.8~4.5 | 6.0~7.0 | 4.8~5.8 | 1.8~2.3 | 7.75~8.75 |
| | back metal B | SCM | 35.0 | 0.18~0.23 | 0.15~0.35 | 0.6~0.85 | 0.33 or less | 0.33 or less | 0.9~1.2 | | 0.15~0.3 | | |

In this respect, the shapes and arrangements of the respective portions of the finger joint cutter as illustrated in each of the above embodiments are merely illustrative, and it is possible to perform various changes without departing from the gist of the present invention.

INDUSTRIAL APPLICABILITY

As explained so far, the finger joint cutter according to the present invention exhibits both, wear resistance and chipping resistance, and is thus useful as a rotating cutting tool for processing finger joints that are one kind of joints for use with wood materials or the like.

What is claimed is:

1. A finger joint cutter including cutting portions that project outward in a radial direction at a plurality of portions around an outer periphery of a body and that form finger joints by processing end portions of objects using the cutting portions, wherein each cutting portion has a cutting surface, a periphery of a tip end of which is formed of a first steel material of high hardness, while a remaining portion of the cutting surface is formed of a second steel material that exhibits a higher toughness than that of the first steel material, wherein the hardness of the first steel material is higher than the hardness of the second steel material, wherein the first steel material has a different chemical composition than the second steel material, wherein the second steel material is one of a tool steel, a HSS, and a semi-HSS, and wherein the first steel material and second steel material are joined together through forge welding.

2. The finger joint cutter as claimed in claim 1, wherein at least one of an outer peripheral flanks and side flanks, which continue from the cutting edges of each cutting portion, is covered by a hard film.

3. The finger joint cutter as claimed in claim 1, wherein each cutting portion comprises at least two chevron shaped cutting surfaces connected together by an extension of the second steel material such that the plurality of cutting surfaces are arrayed parallel to each other.

4. The finger joint cutter claimed in claim 1, wherein the second steel material is at least 4Rc softer and not more than 8Rc softer than the first steel material.

* * * * *